(12) United States Patent
Protz

(10) Patent No.: US 6,792,653 B2
(45) Date of Patent: Sep. 21, 2004

(54) COMBINATION MULTI-PURPOSE CLIP

(75) Inventor: Wm. F. Protz, Lake Forest, IL (US)

(73) Assignee: Santa's Best, Northfield, IL (US)

( * ) Notice: Subject to any disclaimer, the term of this patent is extended or adjusted under 35 U.S.C. 154(b) by 0 days.

(21) Appl. No.: 10/331,409

(22) Filed: Dec. 30, 2002

(65) Prior Publication Data

US 2004/0123434 A1 Jul. 1, 2004

(51) Int. Cl.$^7$ ............................................. A44B 21/00
(52) U.S. Cl. ............................. 24/485; 24/343; 24/667; 24/669
(58) Field of Search ............................. 24/3.12, 580.1, 24/580.11, 596.1, 343, 346, 349, 651, 667, 669, 665, 686

(56) References Cited

U.S. PATENT DOCUMENTS

| | | | | |
|---|---|---|---|---|
| 4,527,760 A | * | 7/1985 | Salacuse | 248/108 |
| 4,688,961 A | * | 8/1987 | Shioda et al. | 24/580.11 |
| 5,054,170 A | * | 10/1991 | Otrusina | 24/669 |
| 5,274,887 A | * | 1/1994 | Fudaki | 24/265 H |
| 5,604,958 A | * | 2/1997 | Anscher | 24/3.1 |
| 6,059,156 A | * | 5/2000 | Lehtinen | 224/197 |

* cited by examiner

Primary Examiner—Robert J. Sandy
(74) Attorney, Agent, or Firm—Leon I. Edelson; William C. Clarke; Levenfield Pearlstein

(57) ABSTRACT

This invention relates to a multi-purpose combination clip comprising two clips separably coupled together, each having a holder portion distinct in function from the other for each detachably holding a supported member wherein the supported members can be of varying physical dimensions. The invention relates to a general purpose utility clip for general purpose applications wherein plastic material of the clip structure provides required compression and engagement strength to the two clips which individually are integral one piece plastic structures.

14 Claims, 2 Drawing Sheets

COMBINATION MULTI-PURPOSE CLIP

FIELD OF THE INVENTION

This invention relates to a combination multi-purpose clip which consists of two clips coupled together wherein the two clips can be separated and reattached to each other in 90°, 180°, and 360° rotation from the original orientation. This invention is also directed to a combination clip which consists of two clips coupled together for holding and/or grasping objects of multiple shapes and for supporting members.

BACKGROUND OF THE INVENTION

Many people hang objects on shelves, attach single objects to other objects, and couple objects together in a non-uniform fashion wherein the orientation of each coupled or supported object is not uniform. Decorative accessories can be hung from shelves, windows, curtain rods, and other household surfaces and objects. Among these decorative accessories are Christmas stockings, Christmas lights, decorative garlands and similar objects, including light strings.

The prior art discloses clips for securing objects to support or for clipping two objects together but currently available clips are designed for a single purpose which, in turn, limits their utility as a general purpose clip suitable for use in many different applications. The instant invented clip has been devised to provide a general purpose clip useful and applicable to different coupling requirements of objects and coupling conditions.

DESCRIPTION OF THE PRIOR ART

Holding clips in the prior art encompass a wide range of clips and holding devices from combination clips comprising fasteners which join two clips into a single coupling device, for use in multiple applications, to single purpose fasteners such as clothespins, tag fasteners for label attachment, and clips for holding single objects such as magazines and display objects.

For example, U.S. Pat. No. 6,378,827 to Kachines discloses a clip which can be inserted onto the edge of a shelf wherein the two arms of the clip contact the upper and lower surfaces of the shelf and form a support hook from which objects can be hung. U.S. Pat. No. 5,517,731 to Spykerman discloses a clip for joining two objects together wherein two clips are joined together by a first clip extending into the body of a second clip in a removable mounting. U.S. Pat. No. 4,688,961 to Shioda, et al., discloses a combination clip comprising a pair of identically shaped clips each having a holder at one end for detachably holding a supported member and a pivotal coupler member at the other end. The pivotal coupler member has a shaft which fits into the pivotal coupler member of the other clip and allows the two clips to be coupled together for mutual rotation about their shafts. The range of mutual rotation is defined by the sides of the coupler members.

Spring activation of clips is taught in U.S. Pat. No. 2,810,176, "Tag Fastener," U.S. Pat. No. 2,583,020 "Clothespin," U.S. Pat. No. 1,640,497 "Magazine Clip" and U.S. Pat. No. 1,222,510 "Wire Clothes Pin," wherein resilient plastic or metal provide clamping jaws or members in an arcuate or spring arrangement, U.S. Pat. No. 2,853,020, "Clothespin" teaches a clothespin having a pair of spring pressed jaw members, the longitudinal and transverse movement of which is restrained to definite limits by notches cut in the jaw members wherein the entire clothespin consists of an integral one-piece plastic structure.

Methods of joining two objects together which allow ready engagement and disengagement of the two objects is taught in U.S. Pat. No. 5,542,159 to Schultz and U.S. Pat. No. 3,614,157 to Hendrickson, et al. Schultz '159 teaches a coupling member for coupling two objects together which includes an attachment portion and a coupling portion. The attachment portion includes a member which attaches to an object. The coupling portion includes a male coupling element receivable within a female coupling element. Both the male element and female element are T-shaped and both shapes cooperate geometrically to interlock when the two members are mated with each other. Hendrickson '157 teaches a coupling attachment to releasably hold two chairs together. The attachment comprises a pair of mutually interlocking fittings which are identical with each other except as to orientation, the fittings used on the right-hand side of a chair being inverted with reference to the fittings on the left hand side of the other chair, all fittings being connected to each other by flanges of the channel-shaped fittings. A slot at the end of each flange is fitted with a headed stud which is receivable within the slot of the other flange in reverse orientation. A relative vertical movement of the two mutually interlocking fittings permits ready engagement and disengagement of the coupled chairs.

It is an object of this invention to provide a multiple ended holding clip wherein each end is suitable for holding objects of varying physical characteristics such as rotund and/or squared dimensions and being attached to varying support objects such as shelves or objects requiring insertion of a support arm of the holding clip.

It is an object of this invention to provide a multiple ended holding clip wherein each end clip structure is readily engaged and disengaged from the other end clip structure as desired by the user.

It is an object of this invention to provide a multiple ended holding clip wherein each end clip structure can be readily disengaged from the other end clip structure and readily reengaged in a different orientation to the other end clip structure in a 90°, 180°, or 360° rotation from the original attachment.

It is an object of this invention to provide two end clips comprising a single multi-purpose clip wherein the two end clips are coupled together in T-shaped coupling elements of male and female members wherein coupling elements cooperate geometrically to interlock when the two members are mated with each other.

It is an object of this invention to provide a multiple ended clip wherein the entire dual-ended clip consists of two integral one-piece plastic structures wherein the plastic material has the required resiliency and strength to provide the required compression and engagement strength to the arcuate and compression arms of the end clips.

SUMMARY OF THE INVENTION

This invention relates to a multiple-ended dual clip wherein each end comprises a clip, wherein the two clip ends can be separated and reattached in different orientation to each other in 90°, 180°, or 360° rotation from the original attachment, wherein one end clip has a male T-shaped coupling element member comprising a suitably squared projection and the other end clip has a female T-shaped squared coupling element opening member suitably sized to receive the male T-shaped coupling member wherein the two coupling members cooperate geometrically to interlock the two members when the two members are mated with each other and can be readily disengaged and re-engaged with each other. The female T-shaped squared coupling opening member has a cross shoulder yoke brace to interlock the male T-shaped squared projection within the female T-shaped squared coupling opening. Each end has a holding clip with opposing members, the end with the female coupling opening member having a pointed opposing arm, the end with the male T-shaped coupling member having opposing arms which intersect to provide a retention clip. The two clip ends are individually suitable for holding and clipping onto objects of varying physical dimensions. This invention relates to a general purpose utility clip for general purpose applications and utility wherein the plastic material of the structure provides the required compression and engagement strength of the arcuate and compression arms of the end clips and the clips comprise two integral one piece plastic structures.

DETAILED DESCRIPTION OF THE PREFERRED EMBODIMENT

Figure 1:
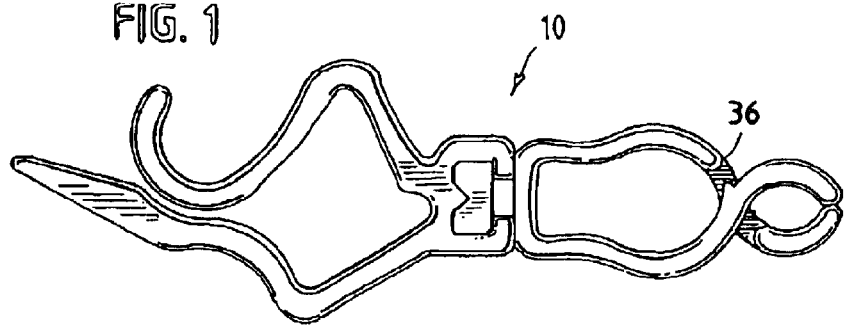
FIG. 1 is an enlarged perspective view of the combination all-in-one clip showing the two clips coupled together.
Figure 2:
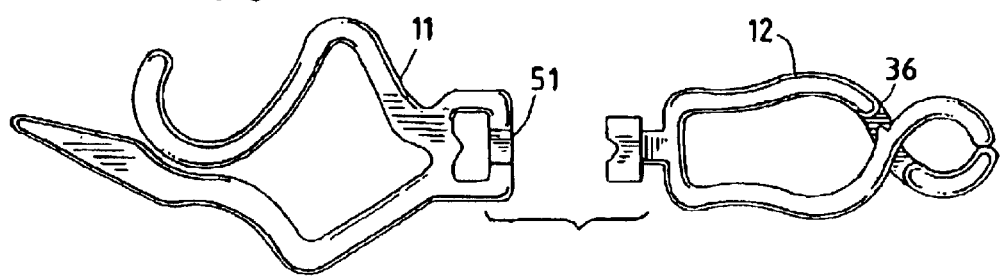
FIG. 2 is an enlarged perspective view of the two individual clips showing the male coupling element receivable within the female coupling element wherein both the male coupling element and female coupling element are T-shaped and the female coupling element comprises a cross shoulder yoke brace to lock and retain the male coupling element in place and the two coupling elements are reciprocally ridged and grooved, the female element being ridged, the male element being groved.

Referring now to the drawings and initially to FIGS. 1–5, these are illustrated perspective views of the combination multi purpose clip which consists of two clips coupled together which can be separated and reattached in 90°, 180°, and 360° rotation from the original orientation.

With continued references to the accompanying drawings wherein like characters designate similar parts throughout the various views, as shown in FIG. 1, reference numeral 10 is used to designate the combination multi purpose clip with each end clip having spring-loaded holding jaws. The multi-purpose clip structure comprises a plastic material having adequate rigidity, elasticity and resiliency so as to form resilient opposing jaw members.

Figure 4:
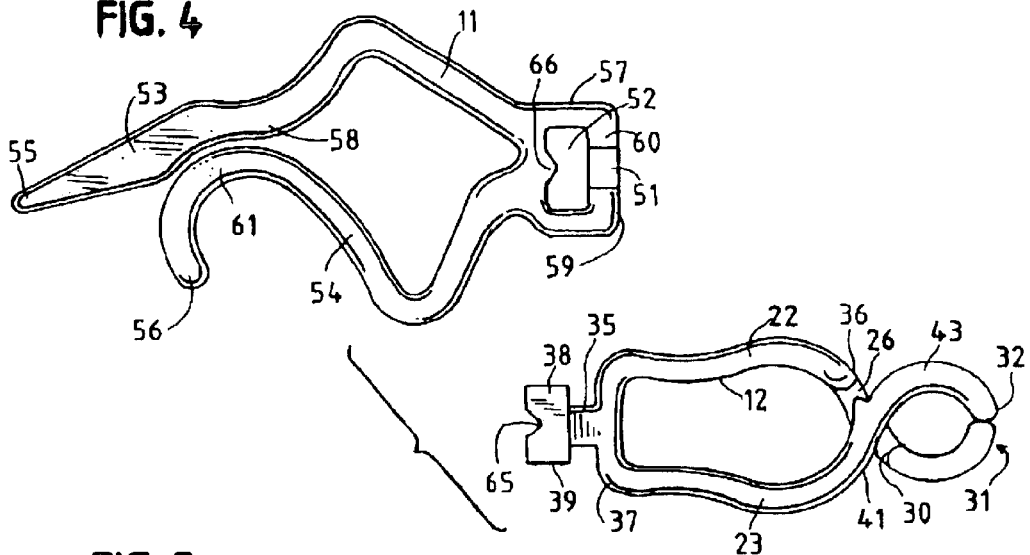
FIG. 4 is an enlarged perspective view of the two individual clips showing the grooved mating notches of the male clip structure and the cross shoulder yoke brace and the reciprocal mating ridge of the female clip structure.

The female coupling clip 11, see FIG. 4, has a pair of opposing arms 53 and 54 formed as part of the head 57, arm 53 terminating in a spade-like end 55, arm 54 terminating in an up-turned hook-like projection with a rounded end 56. The opposing arms 53 and 54 are formed to provide an expanded opening wherein the expanded opening is trapezoidal shaped to provide grasping arms for objects of varying dimensions and multiple shapes. The opposing arms 53 and 54 of the female coupling clip do not mate. Opposing arm 53 of female coupling clip 11 has a curved arc 58 to contact a top surface of an external support structure to which the multi-purpose clip 10 is attached. The opposing arm 54 curve 61 opposite the curved arc 58 of arm 53 provides gripping force to anchor the multi-purpose clip 10 to an external support structure by gripping the under side of the external support structure (not shown). The expanded opening between opposing arms 53 and 54 and the up-turned rounded end 56 of arm 54 permits ready engagement of the female coupling clip 11 with an external support structure on an object (not shown) to be grasped. The spade end 55 of arm 53 permits insertion of female coupling clip 11 into a holding material.

The female coupling element of the female coupling clip 11 comprises a T-shaped inlet 52 in the head 57 suitably sized to receive the T-shaped male coupling member stud 39 with a large head 38, narrow neck 35 and grooved mating notch 65 of the male coupling clip 12. A cross shoulder yoke brace 51 between the arms 59 and 60 of the head 57 of female coupling clip 11 engages the narrow neck 35 of the male coupling clip 12 and retains the male coupling clip 12 in position when female clip 11 is joined with male clip 12, by inserting head 38 within inlet 52, neck 35 inserted between arms 59 and 60 into inlet 52, ridge 66 mating with grooved mating notch 65 of the male clip 12.

The male coupling clip 12 has opposing arcuate arms 22 and 23 formed as a part of the male coupling clip head 37 and are arranged in a crossing relation, the ends of which are angularly offset to form opposed jaw members 31 and 32. The T-shaped stud of male coupling clip 12 has two grooved notches 65 and 67, notch 67 not shown, at 90° angles to each other, to mate with ridge 66 in rotation of each clip structure in 90°, 180° or 360° rotation.

Figure 3:
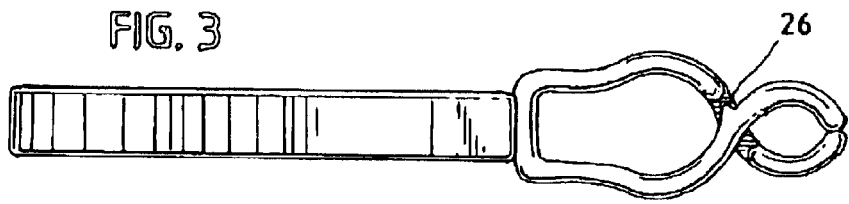
FIG. 3 is a side elevational view of the female clip structure at a 900 angle from the male clip structure.
Figure 5:
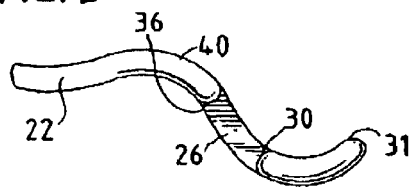
FIG. 5 is an enlarged perspective view showing in detail an arm and jaw of the male clip structure.
Figure 6:
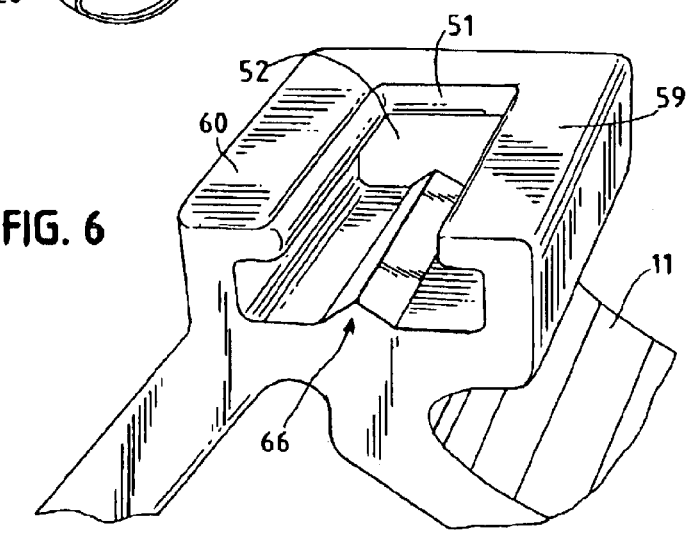
FIG. 6 is an enlarged perspective view of the female shoulder yoke cross brace and the reciprocal ridge of the female clip structure to engage the grooved mating notches of the male clip structure.

The lower portion of the arcuate arms 22 and 23 of male coupling clip 12 are provided with longitudinal grooves on one side, 26 on arcuate arm 22, shown in FIG. 4, and 27 on arcuate arm 23 (not shown), to provide pairs of spaced shoulders 40, see FIG. 5, and 41, the spaced shoulders 40 and 41 forming the bottom of the groove defined by flanges 36 and 30 on one opposing arm 22, as shown in FIGS. 3 and 4, and flanges 42 and 43 on opposing arm 23, not shown in FIGS. 3 and 4, and side walls 26 of opposing arm 22 and 44 (not shown) of opposing arm 23. The flanges 36 and 30 on arm 22, FIG. 5, and flanges 42 and 43 (not shown) (FIG. 4) on arm 23 overlie the recesses 26 and 27 (not shown). The sides of the arms 22 and 23 are accordingly arranged in a crossing relation within the recesses 26 and 27 (not shown), being held in position by the rigidity, elasticity and resiliency of the plastic material of the multi-purpose clip.

In operation, the arcuate arms 22 and 23 of the male clip 12 are depressed in opposition to the inherent outward urging of the resilient spring action of the opposing arms to open the closed clip jaws 32 and 31 of the arcuate arms 22 and 23. The flanges 36 and 42 on the opposing arms 22 and 23 will abut the arms 23 and 22 within their recesses 26 and 27 and limit the opening movement of the male clip. Upon release of the depression force upon the arcuate arms 22 and 23 of the male clip 12, the jaws 31 and 32 will close and hold an object within the jaws 31 and 32.

In operation, the female clip 11 is pressed onto an object to be held by pressing arms 53 and 54 over the said object through the curved arc 58 of arm 53 to the expanded trapezoidal opening between arms 53 and 54. The female clip 11 can be held in position on a support object by pressing arms 53 and 54 onto a longitudinal support with width greater than space between arms 53 and 54 at the curved arc 58 of arm 53 and the curve of arm 54. The female clip 11 has the option of insertion of spade end 55 of arm 53 into a holding material, thus fixing the combination multi purpose clip 10 in position.

In the foregoing description, the invention has been described with reference to a particular preferred embodiment, although it is understood that the specific details are illustrative and that the invention may be carried out in other ways as, for example, the male and female coupling elements can cooperate geometrically to inter engage with each other without a cross shoulder yoke brace to retain the male T-shaped square projection within the female coupling opening, by engaging the opposing shoulders of the female coupling opening, and without the grooved mating notches of the male clip structure and the reciprocal mating ridge of the female clip structure. An alternative embodiment of the instant invention accordingly comprises an embodiment without the said cross shoulder yoke brace of the female structure and without the grooved mating notches of the male clip structure and the reciprocal mating ridge of the female structure. A further alternative embodiment comprises the instant invention with the said cross shoulder yoke brace but without the grooved mating notches of the male structure or the mating ridge of the female structure. A further alternative embodiment comprises the instant invention without the cross shoulder yoke brace of the female structure but with the grooved mating grooves of the male structure and the reciprocal mating ridge of the female structure.

Although the present invention has been described in detail, it should be understood that various changes, substitutions and alterations may be readily apparent to those skilled in the art without departing from the true spirit and scope of the present invention. Therefore it is intended by the appended claims to cover all changes and modifications which come within the true spirit and scope of this invention.

What is claimed is:

1. A combination multi-purpose clip comprising:
   two clips separably coupled together, each clip having a coupling element, one of said two clips having a female coupling element comprising a cross shoulder yoke brace and a mating ridge with a mating opening for coupling with a male coupling element, the other of said two clips having a male coupling element comprising a T-shaped stud with two grooved mating notches in said T-shaped stud to couple with said female coupling element;
   said male and female coupling elements being dimensional and configured to mate with corresponding female and male coupling elements; wherein said clips can be separated and re-attached in different orientation to each other in 90°, 180° and 360° rotation from an original orientation;
   each of said clips having a holder portion provided at one end for detachably holding a supported member and, alternatively, holding a supporting member for supporting said combination multi-purpose clip, each holder portion comprising spring-loaded arms;
   wherein the holder portion of said clip having said male coupling element comprises opposing arcuate arms formed as part of a head of the male coupling element and arranged in a crossing relation, the ends of said arcuate arms being angularly offset to form opposed jaw members;
   wherein the holder portion of said clip having said female coupling element comprises opposing arms formed as part of a head of the female coupling element and extending to form an expanded trapezoidal shaped opening between said arms of said female coupling element, wherein said arms of said female coupling element are arranged in a conjoining relation forming said trapezoidal shaped opening, wherein one said arm of said female coupling element terminates in an extended spade-shaped end beyond the other said arm of the female coupling element terminating in an up-turned hook curve with a rounded termination end.

2. The combination multipurpose clip of claim 1 wherein said male coupling element comprising a T-shaped stud with a large head two grooved notches in said head, and narrow neck is suitably sized to mate within a T-shaped inlet in said head of said female coupling element with said female coupling element with a mating ridge suitably sized and positioned within said mating opening of said female coupling element.

3. The combination multipurpose clip of claim 1 wherein said female coupling element comprises a T-shaped inlet in said head of said female coupling element, said T-shaped inlet suitably sized to receive said male coupling element to mate with said male coupling element, said T-shaped inlet in said head having said cross shoulder yoke brace and said I-shaped inlet having said mating ridge suitably sized and positioned to mate with grooved notches of said male coupling element, to interlock and retain T-shaped stud of said male coupling element inserted therein from movement.

4. The combination multipurpose clip of claim 1 wherein said multipurpose clip comprises two integral one-piece plastic clip structures wherein plastic material of said structures has inherent resiliency and structural strength to provide compression and engagement strength to said arms of said two clip structures.

5. The combination multipurpose clip of claim 1 wherein each of said opposing arcuate arms of said holder portion of said multipurpose clip having said male coupling element have an elongated recess for slidably retaining the opposing crossing arm portion so that a longitudinal axis of said opposing arm arcuate arms lie substantially in the same plane, each of said opposing crossing arm portions having a flange portion on each of said opposing arcuate arms slidably engaging said opposing crossing arm portion and restraining the said opposing crossing arm portion to limit opening of said jaws of said male coupling element to receive holder objects.

6. The male coupling element of claim 2 wherein said head of said T-shaped stud comprises a square-shaped projection head and said square-shaped projection head has two grooved notches at 90° to each other.

7. The female coupling element of claim 4 wherein said T-shaped inlet is square-shaped to receive the square-shaped projection head of said T-shaped stud of said male coupling element.

8. A combination multi-purpose clip comprising:
   two clips separably coupled together, each clip having a coupling element, one of said two clips having a female coupling element, the other of said two clips having a male coupling element;
   said male and female coupling elements being dimensional and configured to mate with corresponding female and male coupling elements; wherein said clips can be separated and re-attached in different orientation to each other in 90°, 180° and 360° rotation from an original orientation;

each of said clips having a holder portion provided at one end for detachably holding a supported member and, alternatively, holding a supporting member for supporting said combination multi-purpose clip, each holder portion comprising spring-loaded arms;

wherein the holder portion of said clip having said male coupling element comprises opposing arcuate arms formed as part of a head of the male coupling element and arranged in a crossing relation, the ends of said arcuate arms being angularly offset to form opposed jaw members;

wherein the holder portion of said clip having said female coupling element comprises opposing arms formed as part of a head of the female coupling element and extending to form an expanded trapezoidal shaped opening between said arms of said female coupling element, wherein said arms of said female coupling element are arranged in a conjoining relation forming said trapezoidal shaped opening, wherein one said arm of said female coupling element terminates in an extended spade-shaped end beyond the other said arm of said female coupling element terminating in an up-turned hook curve with a rounded termination end.

9. The combination multipurpose clip of claim 8 wherein said male coupling element comprises a T-shaped stud with a large head and narrow neck suitably sized to mate within a T-shaped inlet in said head of said female coupling element with said female coupling element.

10. The combination multipurpose clip of claim 8 wherein said female coupling element comprises a T-shaped inlet in said head of said female coupling element, said T-shaped inlet suitably sized to receive said male coupling element to mate with said male coupling element, said T-shaped inlet in said head to retain T-shaped stud of said male coupling element inserted therein from movement.

11. The combination multipurpose clip of claim 8 wherein said multipurpose clip comprises two integral one-piece plastic clip structures wherein plastic material of said structures has inherent resiliency and structural strength to provide compression and engagement strength to said arms of said two clip structures.

12. The combination multipurpose clip of claim 8 wherein each of said opposing arcuate arms of said holder portion of said dip having said male coupling element have an elongated recess for slidably retaining the opposing crossing arm portion so that a longitudinal axis of said opposing arcuate arms lie substantially in the same plane, each of said opposing crossing arm portions having a flange portion on each of said arms of said male coupling element slidably engaging said opposing crossing arm portion and restraining the said opposing crossing arm portion to limit opening of said jaws to receive holder objects.

13. The male coupling element of claim 9 wherein said head of said T-shaped stud comprises a square-shaped projection head.

14. The female coupling element of claim 11 wherein said T-shaped inlet is square-shaped to receive the square-shaped projection head of said T-shaped stud of said male coupling element.

* * * * *